United States Patent [19]

Haynes, Jr.

[11] Patent Number: 4,883,501
[45] Date of Patent: Nov. 28, 1989

[54] ALUMINA BONDED ABRASIVE FOR CAST IRON

[75] Inventor: Douglas G. Haynes, Jr., Grand Island, N.Y.

[73] Assignee: Minnesota Mining and Manufacturing Company, St. Paul, Minn.

[21] Appl. No.: 245,589

[22] Filed: Sep. 19, 1988

Related U.S. Application Data

[63] Continuation of Ser. No. 666,131, Oct. 30, 1984, Pat. No. 4,800,685, which is a continuation of Ser. No. 615,663, May 31, 1984, abandoned, which is a continuation of Ser. No. 536,830, Sep. 30, 1983, abandoned, which is a continuation of Ser. No. 331,442, Dec. 16, 1981, abandoned.

[51] Int. Cl.$^4$ .............................................. B24D 3/02
[52] U.S. Cl. ........................................ 51/309; 51/298
[58] Field of Search ................................. 51/298, 309

[56] References Cited

U.S. PATENT DOCUMENTS

| | | | |
|---|---|---|---|
| 3,175,894 | 3/1965 | Foot | 51/298 |
| 3,208,836 | 9/1965 | Biglin et al. | 51/298 |
| 3,454,385 | 7/1969 | Amero | 51/298 |
| 3,498,769 | 3/1970 | Coes, Jr. | 51/298 |
| 3,632,320 | 1/1972 | Henmi et al. | 51/298 |
| 4,126,429 | 11/1978 | Watson | 51/309 |
| 4,314,827 | 2/1982 | Leitheiser et al. | 51/298 |
| 4,518,397 | 5/1985 | Leitheiser et al. | 51/309 |
| 4,543,107 | 9/1985 | Rue | 51/309 |
| 4,741,743 | 5/1988 | Narayanan et al. | 51/309 |

*Primary Examiner*—Paul Lieberman
*Assistant Examiner*—Willie J. Thompson
*Attorney, Agent, or Firm*—Donald M. Sell; Walter N. Kirn; Richard Francis

[57] ABSTRACT

This invention concerns the discovery that sol-gel process alumina abrasive grain provides superior performance in bonded abrasives for grinding cast iron. In a preferred form it is disclosed that bonded abrasives of sol-gel process alumina abrasives in combination with other abrasive grains such as those of silicon carbide and fused alumina also provide superior grinding of cast iron.

10 Claims, No Drawings

ALUMINA BONDED ABRASIVE FOR CAST IRON

This is a continuation of application Ser. No. 666,131 filed Oct. 30, 1984. now U.S. Pat. No. 4,800,685, which is a continuation of Ser. No. 615,663, May 31, 1984, abandoned, which is a continuation of Ser. No. 536,830, Sept. 30, 1983, abandoned, which is a continuation of Ser. No. 331,442, Dec. 16, 1981, abandoned.

TECHNICAL FIELD

This invention relates to bonded abrasive materials and methods of abrasion utilizing abrasive materials, and more particularly relates to the grinding of cast iron.

BACKGROUND ART

The grinding of cast iron generally requires bonded abrasive articles, usually wheels, which are capable of removing large amounts of metal. Preferably, the wheels have long life for more efficient grinding and lower cost. Bonded abrasive wheels are used for trimming and cleaning of castings of cast iron; this use is commonly called snagging. In the snagging art, it has been known that bonded abrasive grinding wheels employing aluminum oxide as the sole abrasive have not been favored. It is believed that grains of standard fused aluminum oxide are too resistant to wear or breakage and, in use, the grains tend to become dull instead of breaking to expose new grinding surfaces. The dull surface of the grain results in low metal removal rates and generation of excessive frictional heat.

Therefore, in grinding, i.e., snagging of cast iron, the preferred abrasive historically has been a combination of silicon carbide and aluminum oxide. It is believed that the silicon carbide, being more friable than aluminum oxide, causes the wheel to wear at an accelerated rate and constantly expose new, sharper grinding surfaces. A more recent development has been the use of a co-fused zirconia-alumina abrasive, as described in U.S. Pat. No. 3,181,939. This material employs a particular crystalline structure to produce an even rate of wear and creation of new grinding surfaces.

While the zirconia abrasives which comprise a combination of alumina with about 35 to 50% zirconia have performed satisfactorily, their high cost has created a desire for a less expensive abrasive Further, alumina zirconia abrasives are more dense than other abrasive which would provide less rotational stress in abrasive wheels and less operator fatigue during hand grinding.

Recently in European Patent Publication No. 0 024 099, published Feb. 25, 1981 a sol-gel alumina abrasive grain is disclosed. This grain is suggested for use in bonded abrasives, but examples and tests all involve use with coated abrasives.

U.S. Patent Application Ser. No. 267,495, filed May 27, 1981 in the names of Robert Seider and Alvin Gerk also discloses sol-gel abrasives, and suggests use in either coated or bonded applications.

DISCLOSURE OF THE INVENTION

It is an object of this invention to overcome disadvantages of prior bonded abrasive articles for grinding cast iron.

A further object of this invention is to produce an improved abrasive for the grinding of cast iron.

Another object of this invention is to form high performance light-weight grinding wheels.

A further object of this invention is to form grinding wheels which grind cast iron at higher rate of metal removal than prior abrasives.

Another further object of this invention is to form grinding wheels that cut cast iron with less pressure.

A still further object of this invention is to form a bonded abrasive for grinding cast iron with a longer life than achieved by prior abrasives.

These and other advantages of the invention are achieved by utilization of a sol-gel process abrasive grain in a bonded abrasive article used for grinding cast iron.

It has been found that, when grinding cast iron, sol-gel abrasives provide far superior performance than ordinary fused alumina abrasives. In fact, surprisingly, the performance is equal or superior to that of fused alumina zirconia. Surprisingly, sol-gel alumina abrasives are softer than fused alumina abrasives but nevertheless do not dull easily in bonded abrasive use. Ordinary fused alumina grain becomes dull rather than breaking and the grinding becomes slow and ineffective. Zirconia-alumina abrasives also are softer than fused alumina.

BEST MODE FOR CARRYING OUT THE INVENTION

The system of the invention may utilize any size or shape bonded abrasive article which is useful for grinding cast iron. For example, bonded abrasive articles may be in the form of a cup wheel generally between 4 and 6 inches in diameter, or may be in the form of a snagging wheel of up to 36 inches in diameter, or may also be in the form of a depressed center wheel of up to about 9 inches in diameter. A particularly preferred use of the invention is in the larger snagging wheels. It is believed that lighter weight of the alumina grain allows higher speed of the wheel, and therefore higher cutting rates, than possible with heavier zirconia alumina grains.

The invention may be practiced with any matrix of bonding system. A preferred bonding system is a phenolic resin bond. This is a particularly desirable bond for wheels used for grinding cast iron as it is not brittle and does not break under the abuse to which the bonded abrasive is subjected during snagging. However, other bonding systems such as other resins, rubber, shellac or vitrified bonds may be utilized, particularly when more precise grinding than snagging is being performed.

It is known in the formation of bonded abrasive articles that mixtures of grains may be utilized. In some cases, mixtures are utilized to provide an improvement in performance, such as the utilization of silicon carbide in combination with fused aluminum oxide for snagging of iron. In the case of the utilization of sol-gel formed grains in snagging of cast iron, it may be desirable to blend the sol-gel grains with a lower cost abrasive grain such as conventional silicon carbide. In this instance, however, the blending would be to lower cost of the bonded abrasive at a trade-off of slightly less performance. Any ratio of conventional silicon carbide grain to sol-gel abrasive grain may be utilized in this invention. A preferred blend is between about 50 and about 80% sol-gel alumina abrasive by weight of total grain weight of the abrasive for good metal removal at a reasonable cost. An optimum blend would include about 70% by weight of total grain weight sol-gel alumina abrasive grain for a bonded abrasive article, and this article would perform almost as well as 100% sol-gel alumina grain but at lower cost. However it is within the scope of the invention to blend conventional silicon carbide grain or other abrasive grain in a range of between 0 and about 70% by weight of total grain depending on the particular utilization and cost desired.

It is also within the scope of the invention to form bonded abrasive articles of blends of sol-gel alumina grain and the conventional fused alumina abrasive grains. Such blends have been found to give good performance with less use of the sol-gel abrasives and some weight savings over wheels containing zirconia-alumina abrasive. Surprisingly, articles having blends of fused alumina and sol-gel alumina have been found in some instances to give superior perforgrains are those disclosed in European Patent Application Publication No. 0 024 099, published on Feb. 25, 1981, and in U.S. Patent Application Ser. No. 267,495, filed on May 27, 1981 by R. Seider and A. Gerk. Grains formed by the techniques of Seider and Gerk are preferred because of low cost and good abrasive properties. The disclosure of U.S. Ser. No. 267,495 is hereby incorporated by reference for its teaching of grains suitable for the invention.

The term performance when used herein in reference to bonded abrasive articles refers to either or both of two measurements. One measurement is "grinding ratio" (gained by dividing total metal removed by total wheel wear) which relates to the total amount of metal of bonded abrasive article is "metal removal rate" which is the speed of metal removal without regard to how quickly the bonded abrasive article is wearing away. Generally, how important each factor is depends on the use and customer. If large amounts of metal need to be removed quickly or if labor costs are high, then metal removal rate is most important. The retail market such as to the homeowner may value grinding ratio more highly as an indication that the bonded abrasive wheel will last a longer time.

The following Examples illustrate the system of the invention in comparison with prior abrasives for cast iron. All formulations are by weight unless otherwise indicated. Weights are in grams unless otherwise indicated.

EXAMPLES 1–5

The following procedure was used to produce grinding wheels for testing sol-gel abrasive performance:

Five Example abrasive formulations were manufactured, with compositions as shown in Table 1. With regard to the raw materials, the grit size designations and the terms "black silicon carbide", "brown aluminum oxide", and "powmance to bonded abrasive articles containing only sol-gel abrasives or zirconia abrasives; not Examples 7, 8 and 9.

The blends of sol-gel alumina grain and fused alumina grain may be of any percentage blend which gives the desired performance characteristics at a particular manufacturing cost. Typically, the blended bonded abrasive article would contain sol-gel alumina grain greater than about 30% of the grain weight. A preferred range is between about 30 and about 70% of total grain weight of the sol-gel abrasive for best performance. About 70% by grain weight of sol-gel alumina grain appears to give optimum performance in view of results showing that metal removal rate is high and wear of the abrasive article is low.

In the bonded abrasives of the invention for grinding cast iron, the sol-gel grain may be of any size suitable for the use intended. Generally, grit size of between about 10 and about 30 grit is utilized for snagging wheels although for some uses grit of up to about 4 grit may be utilized. Other grits such as for use with vitreous bonds for finer work may be between about 46 and about 100 grit. The term cast iron as used herein refers to as-cast gray cast iron and to malleable cast iron formed by annealing white cast iron. It also refers to nodular cast iron where the matrix is a mixture of pearlite and ferrite and is substantially free of massive primary carbides.

The sol-gel abrasive utilized in the invention may be any sol-gel formed ceramic composition which has been demonstrated to have abrasive qualities. Such sol-gel abrasives are formed by a technique which has been referred to as chemical processing as opposed to the conventional technique for fused alumina abrasives in which alumina material is brought to a molten temperature and then cooled. The cooled material is then crushed and graded by size to form grinding materials. In contrast, the chemical formation involves formation of a sol which is gelled, dried, crushed and then heated to sintering temperature. Typical of sol-gel dered fluorspar" (a fine grind fluorspar of 95% purity used as a grinding aid) refer to materials commonly used in the industry. A typical black silicon carbide is C6 silicon carbide and a typical brown aluminum oxide is C35 aluminum oxide both available from The Carborundum Company, Niagara Falls, N.Y. "Zirconia abrasive" refers to an abrasive mixture of about 40% zirconia and about 60% alumina, fused and cooled to form a eutectic crystalline structure available from Norton Company, Worcester, Mass. Examples 1, 5 and 4 are controls.

The liquids resole used was Varcum 8121; the powdered resin was Varcum 7909; both are phenolic resins and are available from Varcum Chemical Company Division of Reichold Chemical, Niagara Falls, N.Y.

Mixes were made with each formulation by placing the abrasive grain into a mixer, adding the liquid resin, and mixing until a uniform coating was achieved. The remaining ingredients were blended thoroughly, then added slowly to the wetted grain in such a manner that all the powder was picked up by the abrasive grains. In this way, granular free-flowing mixed free of loose powder were achieved.

Abrasive products of the type known as Type 11 cup wheels, $6 \times 2 \times \frac{3}{8} - 11$, were made with each of the test mixes. This is a cup wheel 6 inches in greatest diameter, 2 inches thick and has an arbor $\frac{3}{8}$ inch in diameter. Into a steel mold of appropriate size and shape was placed a threaded metal bushing, followed by a specified amount of abrasive mixture which was then evenly distributed within the mold. The mold was covered, placed in a hydraulic press, and pressed to apply 3000 psi of pressure to the abrasive wheel. After pressing, the mold was disassembled and the pressed abrasive article measured and checked for density. In order to produce articles with comparable volumetric percentages of abrasive, bond, and porosity, wheels of formula 1 and 2 were pressed to a density of 2.34 grams/cc, those of formula 3 and 5 to 2.54 grams/cc, and those of formula 4 to 2.79 grams/cc.

The resulting uncured abrasive products were bedded in sand and cured in an oven cycle of:
 heat from 80°–350° F.: 26 hours,
 hold at 350° F.: 9 hours.

After cooling, the grinding wheels were cleaned and speeded to 1.5 times their operating speed before being tested.

Three wheels of each formula were tested for grinding performance using the following test procedure:

A test wheel was mounted on a Chicago Pneumatic Grinder, model CP3490, and applied to a 12 inch round plate of Class 35 cast iron for a 15 minute grinding period by an individual knowledgeable in manual grinding procedures. The weights of both the grinding wheel and cast iron plate were measured before and after the test, and the differences in weight were calculated as "total metal removed" and "total wheel wear". A third value, called "grinding ratio" was calculated by dividing total metal removed by total wheel wear. This ratio is commonly used in the industry to compare wheel performance; a larger value generally represents a better performance.

Average values for the test wheels were found to be as shown in Table 2. It may readily be noted that as sol-gel alumina abrasive replaces the standard alumina and silicon carbide in the standard formula of Example 1, then both the metal removal and the grinding ratio are increased. It may further be noted that a formula consisting of all sol-gel alumina abrasive removes metal at 90% the rate of an equivalent formula utilizing zirconia abrasive, and at a significantly better grinding ratio. The increased grinding ratio results in a significantly better wheel in commercial value.

Example 5 illustrates the general unsuitability of a formula containing 100% fused alumina abrasive. Metal removal rate is much lower than the other Examples, indicating a wheel which would provide low productivity in use.

TABLE 1

COMPOSITION OF ABRASIVE WHEEL FORMULATIONS IN PARTS BY WEIGHT

| Material Formula | (Control) Ex. 1 | Ex. 2 | Ex. 3 | (Control) Ex. 4 | (Control) Ex. 5 |
|---|---|---|---|---|---|
| 14 grit black silicon carbide | 36.8 | 36.8 | — | — | — |
| 14 grit brown aluminum oxide | — | — | — | — | 42.0 |
| 14 grit sol-gel abrasive | — | — | 42.0 | — | — |
| 14 grit zirconia abrasive | — | — | — | 42.7 | — |
| 16 grit brown aluminum oxide | 22.8 | — | — | — | 21.0 |
| 16 grit sol-gel abrasive | — | 22.8 | 21.0 | — | — |
| 16 grit zirconia abrasive | — | — | — | 21.4 | — |
| 20 grit brown aluminum oxide | 22.8 | — | — | — | 21.0 |
| 20 grit sol-gel abrasive | — | 22.8 | 21.0 | — | — |
| 20 grit 43% zirconia abrasive (made in accordance with U.S. Patent 3,891,408) | — | — | — | 21.3 | — |
| Liquid phenolic resole | 2.8 | 2.8 | 2.8 | 2.6 | 2.8 |
| Powdered fluorspar (grinding aid) | 5.6 | 5.6 | 4.9 | 4.5 | 4.9 |
| 600 grit black silicon carbide | 2.0 | 2.0 | 2.0 | 1.8 | 2.0 |
| Powdered phenolic novolac | 7.2 | 7.2 | 6.3 | 5.7 | 6.3 |

TABLE 2

GRINDING PERFORMANCE OF TYPE 11 CUP WHEELS - AVERAGES OF THREE WHEELS (OF EACH EXAMPLE)

| Example | Total Metal Removed, Grams | Metal Removal Rate, gm/min | Total Wheel Wear, Grams | Grinding Ratio |
|---|---|---|---|---|
| 1 (Control) | 728 | 48.5 | 56.3 | 13.3 |
| 2 | 1189 | 79.3 | 69.5 | 17.1 |
| 3 | 1667 | 111.1 | 33.6 | 49.6 |
| 4 (Zirconia Abrasive Control) | 1846 | 123.1 | 61.9 | 29.9 |
| 5 (Control) | 579 | 38.6 | 10.2 | 61.4 |

EXAMPLES 6-10

To test a different range of grinding parameters, example formulations were manufactured with compositions as shown in Table 3. Materials used were identical to those defined in Examples 1-5, unless otherwise indicated.

Mixing was performed in the same manner as described in the preceding Examples.

Abrasive products of the type known as Type 27 depressed center wheels, 7×¼×⅝, were made with each of the test mixes. This is a wheel 7 inches in diameter, ¼ inch thick, with a ⅝ inch arbor hole, having a depressed area in the hub to hold the mounting nut, which allows the wheel to be used for close grinding without interference of the mounting nut on the workpiece. Into a steel mold of appropriate size and shape was placed a 7 inch disc of tissue paper, followed by a 7 inch disc of phenolic resin coated fiberglass mesh. A specified amount of abrasive mixture was added and evenly distributed within the mold, followed by a second 7 inch disc of phenolic resin coated fiberglass mesh. A second specified amount of abrasive mix was the added and evenly distributed within the mold. The mold was covered, placed in a hydraulic press, and pressed so as to apply 3,000 psi of pressure to the abrasive wheel. After pressing, the mold was disassembled and the abrasive article measured and checked for density. In order to produce articles with comparable volumetric percentages of abrasive, bond, and porosity, wheels of Examples 6-9 were pressed to a density of 2.65 gm/cc., while those of Example 10 were pressed to a density of 2.83 gm/cc.

(The phenolic resin coated fiberglass mesh discs referred to are produced in a variety of weave styles and strengths, which may be selected by those familiar with the art of making abrasive products to provide specific desired properties to a grinding wheel. The discs used in the Example are identified as "707 CRX" material, as provided by the Eli Sandman Co., Worcester, Mass.; however, the scope of the invention should not be interpreted as limited to products using this specific material.)

the resulting uncured abrasive products were placed between aluminum batts, then cured in the same oven cycle described previously. After cooling, the wheels were speed tested at 1.5 times their operating speed before being tested.

Three wheels of each formulation were tested for grinding performance using the following test procedure:

A test wheel was mounted on a Bosch electric grinder, Model 1321, and applied to a 12 inch round plate of Class 35 cast iron for a 20 minute grinding period by an individual knowledgeable in manual grinding procedures. The weights of both wheel and plate were measured both before and after the grinding test. "Total metal removed", "total wheel wear" and "grinding ratio" were calculated as previously described. Average values for the various test wheels were found to be as shown in Table 4.

It may be noted from these examples that as sol-gel abrasive replaces brown fused alumina, with all else remaining unchanged, a steady increase in rate of metal removal occurs. It may further be noted that blends of sol-gel abrasive and brown aluminum oxide produce abrasive wheels whose grinding ratios exceed those achievable with either material used alone. By proper formulation, performance comparable or superior to that of zirconia abrasive may be achieved.

TABLE 3

COMPOSITION OF TP27 ABRASIVE WHEEL FORMULATIONS IN PARTS BY WEIGHT

| Material Formula | (Control) Ex. 6 | Ex. 7 | Ex. 8 | Ex. 9 | (Control) Ex. 10 |
|---|---|---|---|---|---|
| 24 grit brown aluminum oxide | 73.0 | 51.1 | 21.9 | — | — |
| 24 grit sol-gel abrasive | — | 21.9 | 51.1 | 73.0 | — |
| 24 grit zirconia abrasive | — | — | — | — | 73.5 |
| Liquid phenolic resole | 3.5 | 3.5 | 3.5 | 3.5 | 3.4 |
| Powdered fluorspar (grinding aid) | 13.0 | 13.0 | 13.0 | 13.0 | 12.0 |
| Powdered phenolic novolac | 10.5 | 10.5 | 10.5 | 10.5 | 9.1 |

TABLE 4

GRINDING PERFORMANCE OF TYPE 27 WHEELS - AVERAGES OF THREE WHEELS (OF EACH EXAMPLE)

| Example | Total Metal Removed, Grams | Metal Removal Rate, gm/min | Total Wheel Wear, Grams | Grinding Ratio |
|---|---|---|---|---|
| 6 (Control) | 755 | 37.8 | 7.3 | 98.8 |
| 7 30% Sol-Gel | 1007 | 50.4 | 10.3 | 107.0 |
| 8 70% Sol-Gel | 1223 | 61.2 | 8.3 | 149.5 |
| 9 100% Sol-Gel | 1405 | 70.3 | 13.3 | 108.2 |
| 10 (Zirconia Abrasive) | 1361 | 68.1 | 9.3 | 148.7 |

The above Examples are intended to be illustrative and not exhaustive of the sol-gel bonded abrasive devices of the invention. For instance, other resins than phenolic resins, could be utilized. The bonded abrasives could be formed with rubber or a vitreous binder.

The invention may be utilized with suitable modifications within the state of the art in other types of bonded abrasives that may be utilized in abrasion of cast iron. For instance, the bonded abrasive could be used in small vitreous stones for fine work or in bonded abrasives intended for hand use rather than power operation. Further, the bonded abrasives could be used with various wheel sizes, arbor openings and combinations of sol-gel abrasives with other abrasive grains such as alumina zirconia grains or with grinding aids other than fluorspar. These and other modifications of the invention will be apparent to those skilled in the art.

What is claimed is:

1. A bonded abrasive in the form of a wheel comprising sol-gel alumina abrasive grain, fused alumina abrasive grain, and a binder material.

2. The abrasive of claim 1 wherein said binder material comprises phenolic resin.

3. The abrasive of claim 1 wherein said sol-gel alumina comprises about 30 to about 70 weight percent of the total abrasive grain in said bonded abrasive.

4. The bonded abrasive of claim 1 wherein said sol-gel abrasive comprises about 90% by weight of the abrasive grain in said bonded abrasive.

5. The bonded abrasive of claim 4 wherein fused alumina comprises about 10% by weight of the abrasive grain in said bonded abrasive.

6. The bonded abrasive of claim 4 wherein said sol-gel abrasive is in a grain size of between about 4 grit and about 100 grit.

7. The bonded abrasive of claim 4 wherein said sol-gel abrasive is in a grain size of between about 10 and about 100 grit.

8. The bonded abrasive of claim 1 wherein said sol-gel abrasive comprises about 70% by weight of the abrasive grain.

9. A bonded abrasive comprising a blend of sol-gel alumina abrasive grain and fused alumina abrasive grain consolidated together with a binder material to form an abrasive wheel, said abrasive wheel having a grinding ratio of at least 108% of the grinding ratio of a comparable abrasive wheel containing fused alumina abrasive grain as the only abrasive grain and at least about equal to a comparable abrasive wheel containing sol-gel alumina abrasive grain as the only abrasive grain.

10. A bonded abrasive comprising a blend of sol-gel alumina abrasive grain and fused alumina abrasive grain consolidated together with a binder material to form an abrasive wheel, said abrasive wheel having a grinding ratio of at least about 150% of the grinding ratio of a comparable abrasive wheel containing fused alumina abrasive grain as the only abrasive grain and at least about 138% of a comparable abrasive wheel containing sol-gel alumina abrasive grain as the only abrasive grain.

* * * * *